United States Patent [19]

Shiraishi

[11] Patent Number: 4,856,881
[45] Date of Patent: Aug. 15, 1989

[54] PHOTOGRAPHIC LENS OF LONG BACK FOCAL LENGTH

[75] Inventor: Akihiko Shiraishi, Kanagawa, Japan

[73] Assignee: Canon Kabushiki Kaisha, Tokyo, Japan

[21] Appl. No.: 100,358

[22] Filed: Sep. 23, 1987

[30] Foreign Application Priority Data

Sep. 25, 1986 [JP] Japan ............................ 61-226541
Sep. 25, 1986 [JP] Japan ............................ 61-226543

[51] Int. Cl.4 .............................................. G02B 9/64
[52] U.S. Cl. .................................................. 350/463
[58] Field of Search ............... 350/463, 458, 459, 460, 350/464

[56] References Cited

U.S. PATENT DOCUMENTS 3,926,506 12/1975 Maeda .................................. 350/460
4,273,424 6/1981 Nanjoh ........................... 350/463 X
4,346,966 8/1982 Nakamura et al. ............. 350/463 X
4,603,948 8/1986 Imai ................................. 350/458 X
4,660,940 4/1987 Ogawa et al. .................. 350/459 X Primary Examiner—Bruce Y. Arnold
Assistant Examiner—Scott J. Sugarman
Attorney, Agent, or Firm—Fitzpatrick, Cella, Harper & Scinto

[57] ABSTRACT

A photographic lens of long back focal length comprising, from front to rear, a first lens unit of negative refractive power, the first lens unit including a first lens of positive refractive power whose front surface is convex toward the front, a meniscus-shaped second lens of negative refractive power convex toward the front and a third lens whose front surface is concave toward the front, a stop for determining F-numbers, and a second lens unit of positive refractive power having a plurality of lenses.

25 Claims, 12 Drawing Sheets.

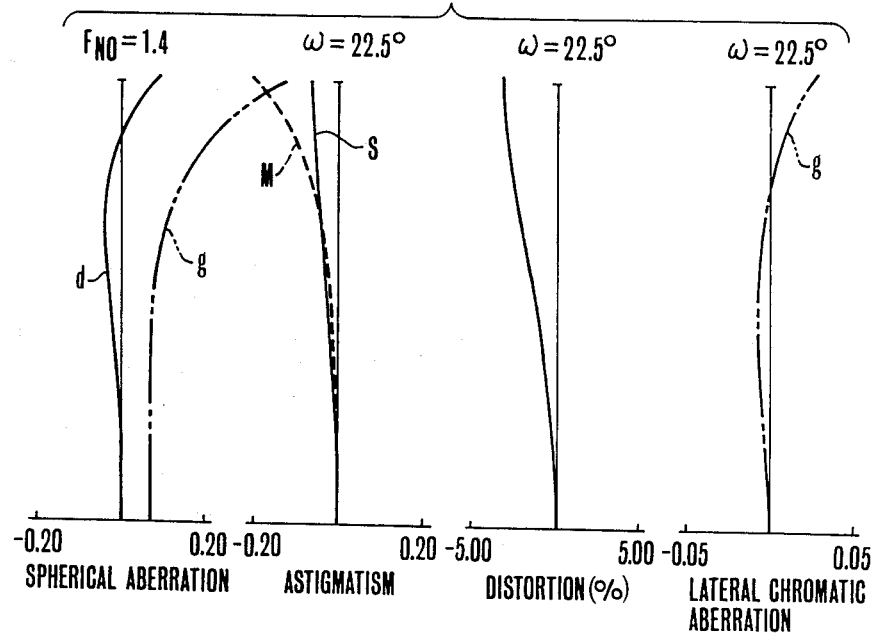
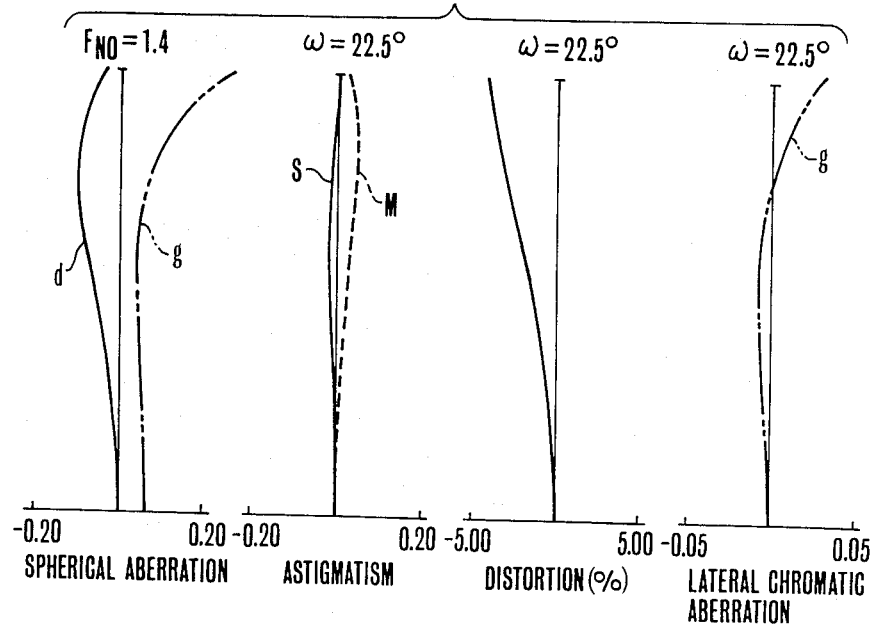

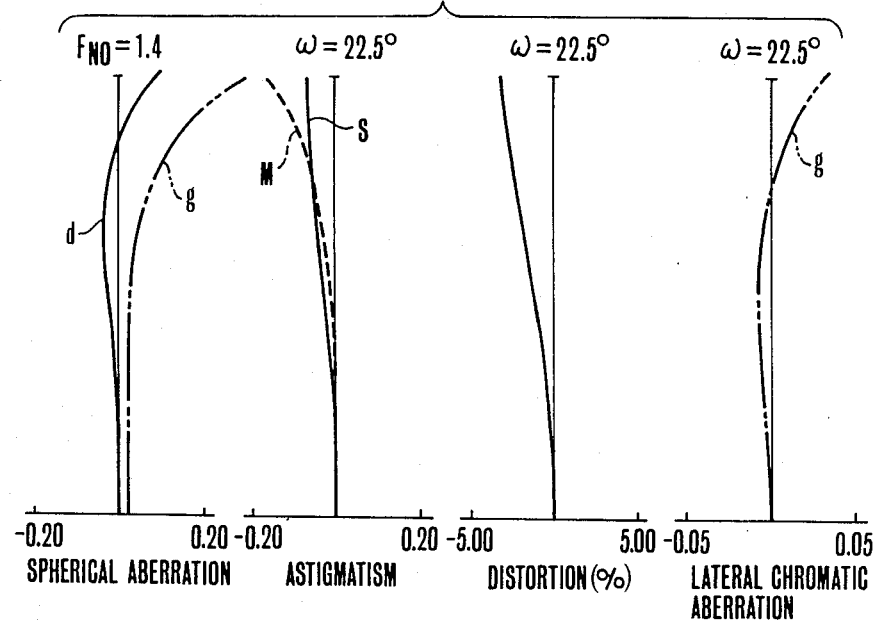
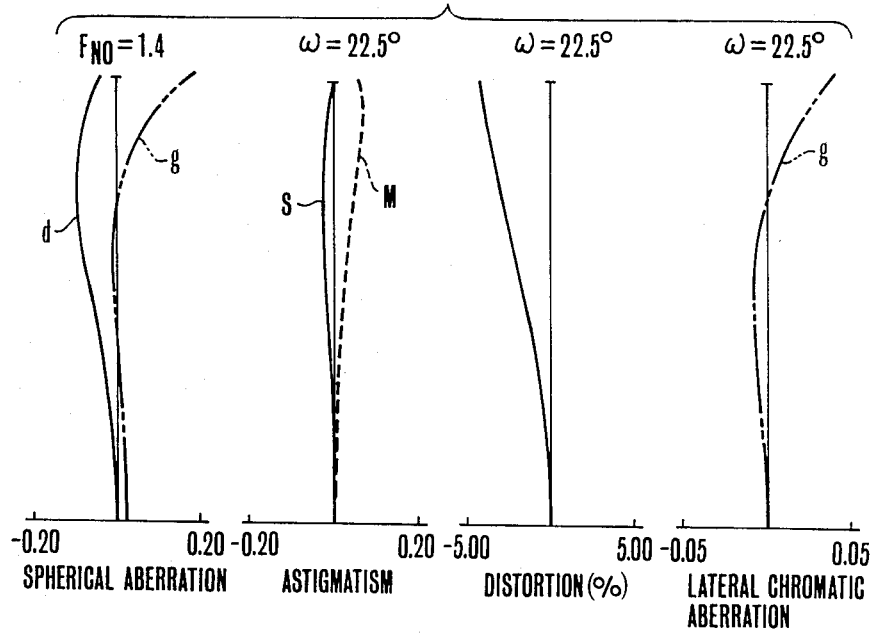

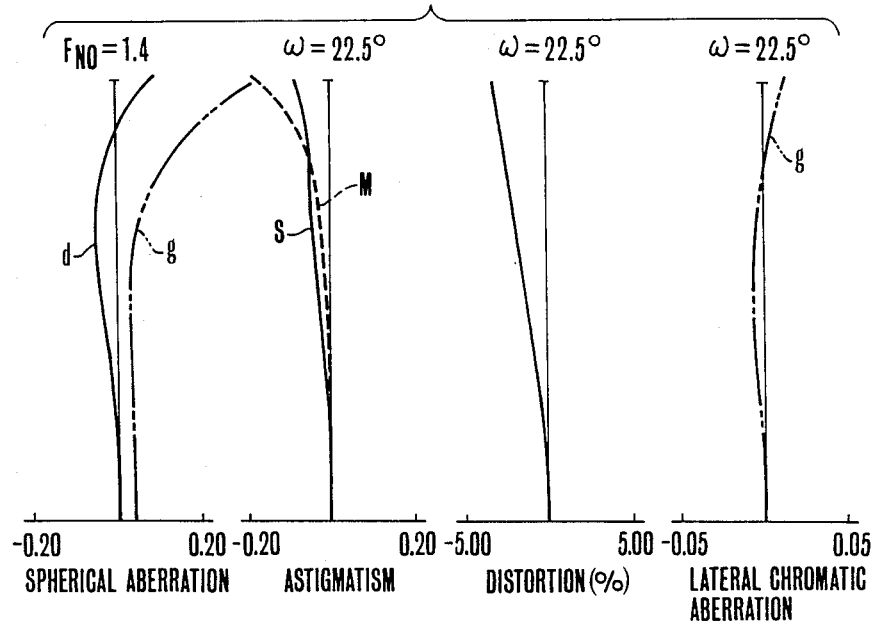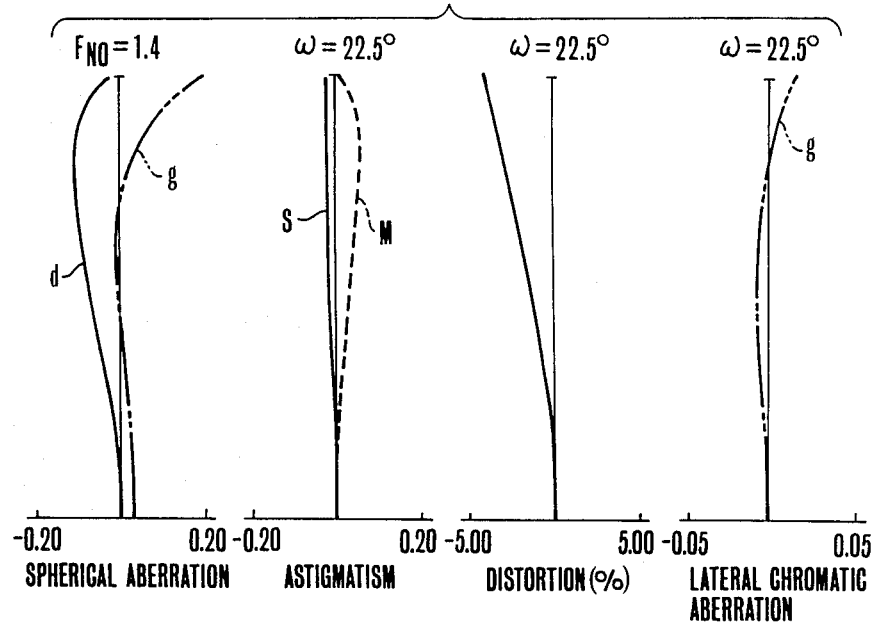

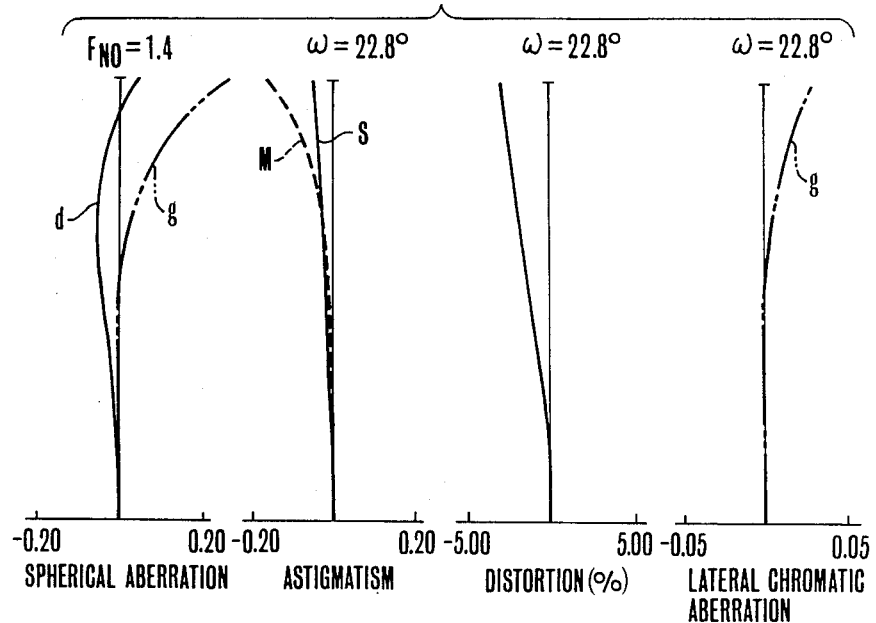
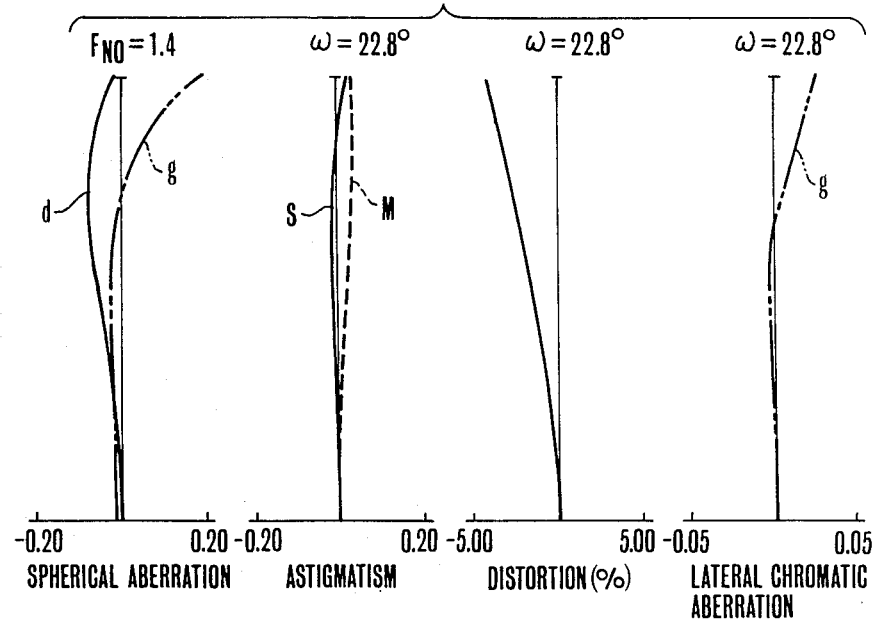

PHOTOGRAPHIC LENS OF LONG BACK FOCAL LENGTH

BACKGROUND OF THE INVENTION

1. Field of the Invention:

This invention relates to photographic lenses of long back focal length, and more particularly to photographic lenses of reduced size with a small number of lens elements, while still maintaining good optical performance at the standard angular field, suited to electronic photographic cameras.

2. Description of the Related Art:

Recently, along with the continuous advance in the technology of video cameras, there have been researched and developed increasing kinds of electronic photographic cameras (still video cameras). The still video camera have their effective picture frame made far smaller than that of the single lens reflex camera for 35 mm photographic film, in most cases, of about 11 mm in diagonal. It is also required that, similarly to the single lens reflex camera using silver halide photographic materials, the still video camera employs a reflex mirror as arranged, for example, just ahead the photosensitive unit. Moreover, there are various glass plates such as low-pass and color filters in front of the photosensitive unit. For these reasons, despite the still video camera has a relatively small picture frame, its back focal length must be made considerably long compared with the single lens reflex camera that has no such glass plates.

For example, in the Gauss type photographic lens of standard focal length with an angular field of about 45 to 46 degrees proposed in Japanese Laid-Open Patent Application No. SHO 62-87922, the back focal length in terms of the diagonal length L of the effective picture frame is about 0.9L. In the still video camera, on the other hand, it must be increased to 2.1L.

To admit of such a long back focal length, the inverted telephoto type is necessarily employed in designing the lens system by the front lens unit of strong negative refractive power and the rear lens unit of positive refractive power.

However, as its negative refractive power strengthens, the front lens unit produces increasing negative distortion, spherical aberration and coma. For good correction of these aberrations, the lens structure becomes complicated. The various aberrations left insufficient to correct in the front lens unit may be corrected by the rear lens unit of positive refractive power. For this case, the structure of the rear lens unit becomes complicated likewise as in the front lens unit. Particularly when a great increase of the relative aperture of the lens system is intended to achieve, this tendency becomes prominent. In the past, therefore, the size of the entire lens system tended to increase. As the document concerning this lens arrangement, mention may be made of Japanese Laid-Open Patent Application No. Sho 61-208020.

SUMMARY OF THE INVENTION

A first object of the present invention is to provide a photographic lens of long back focal length suited to a camera.

A second object is to provide a photographic lens having about eight lens elements in total, a standard angular field of 45 to 46 degrees, a large relative aperture of 1.4 in F-number and a back focal length more than about 2 times the diagonal of the effective picture frame, while still permitting good correction of aberrations over the entire area of the picture frame.

These and other objects will become apparent from the following description with reference to the drawings.

BRIEF DESCRIPTION OF THE DRAWINGS

FIGS. 3(A), 3(B)–6(A), 6(B) are graphic representations of the aberrations of the numerical examples 1 to 4 respectively.

FIGS. 7(A), 7(B)–10(A), 10(B) are graphic representations of the aberrations of the numerical examples 5 to 8 respectively.

Figure 1A:
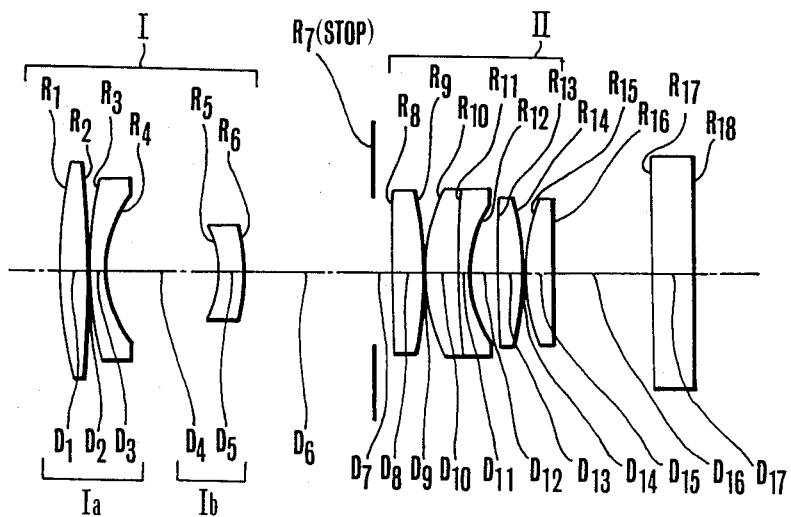
FIGS. 1(A)–1(D) are longitudinal section views of numerical examples 1 to 4 of an embodiment of lenses respectively according to the invention.

In the graphic representations, the aberrations shown in FIGS. 3(A), 4(A), 5(A), 6(A), 7(A), 8(A), 9(A) and 10(A) occur when the first lens unit is focused on an infinitely distant object, and in FIGS. 3(B), 4(B), 5(B), 6(B), 7(B), 8(B), 9(B) and 10(B) when the first lens unit is focused on an object at a distance of 450 mm from the image plane.

In the figures, I denotes the first lens unit, II the second lens unit, S the sagittal image surface, M the meridional image surface, g the g-line and d the d-line.

DETAILED DESCRIPTION OF THE PREFERRED EMBODIMENTS

The embodiments of the present invention are described on the basis of the drawings.

FIGS. 1(A) to 2(D) are longitudinal section views illustrating the respective numerical examples of the embodiments.

In the general embodiment of the invention, with a stop for determining the F-number of an aperture opening at the center of the physical length, a first lens unit I having a negative refractive power as a whole is arranged on its object side, and a second lens unit II having a positive refractive power as a whole is arranged on its image side. In other words, by the arrangement of the negative and positive lens units I and II in this order from front, the lens design of the so-called inverted telephoto type is taken to achieve a desired increase of the back focal length.

The first lens unit I is considered as comprising front and rear parts Ia and Ib. The front part Ia is constructed from a first lens counting from front having a positive refractive power with its front surface convex toward the front and a second lens having a negative refractive power in the meniscus form convex toward the front. The rear part Ib is constructed from a negative lens with its front surface concave toward the front.

And, this lens unit I is well corrected for aberrations in itself. Hence, even when the focusing provision is made at the front side of the stop, or the first lens unit I only is made move, good stability of image aberrations of the optical system can be obtained throughout the focusing range.

In the following, a specific embodiment is described by reference to FIGS. 1(A) to 1(D). In this embodiment, the lens system comprises, from front to rear, a first lens of positive power whose front surface is convex toward the front, a meniscus-shaped second lens of negative power convex toward the front, a meniscus-shaped third lens of negative power concave toward the front, a fourth lens of positive power, a fifth lens of positive power whose front surface has a stronger curvature than the rear surface has, a sixth lens of negative power with its rear surface concave toward the rear, a bi-convex seventh lens and an eighth lens of positive power.

In this lens system, because the on-axis light beam is incident on any of the lenses of the first lens unit at a low height from the optical axis, the first lens unit produces relatively small longitudinal aberrations. For the off-axis light beam, on the other hand, the height of incidence is relatively high at each of the lenses of the first unit.

From this reason, of the lateral aberrations, particularly the astigmatism and distortion are caused to increase.

In the present embodiment, the negative distortion produced from the second, third, fifth, seventh and eighth lenses is well corrected by strengthening the positive refractive power mainly of the rear surface of the first lens.

And, the form of the negative second lens also is made meniscus but convex toward the front. This enables this lens to produce as far small astigmatism as possible and to allow for its rear lens surface which is of negative refractive power and has a divergent action to be utilized for obtaining the prescribed back focal length.

However, such an increase of the positive reflecting power of the rear lens surface of the first lens, in turn, causes production of large negative astigmatism.

And, such an increase of the negative refractive power of the rear lens surface of the second lens causes production of large positive spherical aberration.

In the present embodiment, therefore, the third lens is made up in the negative meniscus form of forward concavity so that its concave surface corrects the negative astigmatism produced by the rear lens surface of the first lens and its concave and convex surfaces correct the positive spherical aberration produced by the rear lens surface of the second lens. And, the aberrations, especially, the astigmatism and the spherical aberration produced in the lens unit I, are well corrected in itself. Hence, the variation of aberration is reduced as small as possible even when the focusing provision is made at the lens unit I.

Because, in the present invention, the lens design employs the inverted telephoto type, also for the fourth and fifth lenses in the second unit, the on-axis light beam enters them in divergent states. So, the front surface of the fourth lens is curved weaker than the rear one is, and further the rear surface of the fifth lens is curved weaker than the front one is, thereby the divergent beam is made to become progressively weaker divergence. In such a manner, high-order spherical aberrations and coma are corrected.

The residual spherical aberrations and coma due to the insufficient ability of the two or fourth and fifth lenses to correct them are corrected by the rear surface of the sixth lens which is concave toward the rear and has a negative refractive power.

Further, the positive astigmatism resulting from the impartment of the negative refractive power to the sixth lens is corrected by those lenses that follow namely, the seventh lens of which both surfaces are convex and the eighth lens of positive refractive power.

In such a manner, the main aberrations are well corrected by specifying the form of each of the constituent lenses.

Though the foregoing discussion has been conducted in connection with how to form each lens element, there are also the following conditions the present invention sets forth. When these conditions too are satisfied, the objects of the invention can be accomplished.

$$0.7 \leq |R5/f| \leq 1.5 \quad (1)$$

$$0.33 \leq D4/D6 \leq 2.0 \quad (2)$$

where f is the focal length of the entire lens system; R5 is the radius of curvature of the front concave surface of the third lens toward the front; D4 is the axial separation between the rear surface of the second lens and the front concave surface of the third lens; D6 is the axial separation between the rear surface of the third lens and the front surface of the frontmost lens of the second lens unit II.

Next, the technical significance of the above-defined inequalities of conditions (1) and (2) is explained.

The inequalities of condition (1) represent a range of the refractive power of the front concave surface of the third lens for well correcting mainly the astigmatism and field curvature of the first lens unit I. When the refractive power becomes too weak beyond the upper limit, the Petzval sum increases to the positive direction so that the field curvature is under-corrected, and further the astigmatism increases to the negative direction. When the negative refractive power becomes too strong beyond the lower limit, the Petzval sum increases to the negative direction so that the field curvature is over-corrected, and further the astigmatism increases to the positive direction objectionably.

The inequalities of condition (2) represent a proper ratio of the separation D4 between the second and third lenses to the separation D6 between the third and fourth lenses for correcting mainly the spherical aberration and astigmatism of the first lens unit I in good balance. When the separation D4 becomes too long beyond the upper limit, the astigmatism increases to the positive direction objectionably. When the separation D4 becomes too short beyond the lower limit, under-correction of spherical aberration results.

In the present embodiment, by the thus-specified form and construction and arrangement of each lens element of the first and second lens units, a photographic lens of long back focal length well corrected for all aberrations is obtained.

Or, also, to obtain a better optical performance over the entire picture frame, the following conditions should be satisfied:

$$1.2 \leq |F_I/f| \leq 2.8 \quad (3)$$

$$0.6 \leq |f_I/f_{II}| \leq 2.2 \quad (4)$$

or $$1.0 \leq |R12(13)/f| \leq 1.8 \quad (5)$$

$$1.7 \leq (N2+N6)/2 \quad (6)$$

where f is the focal length of the entire lens system; $f_I$ is the overall focal length of the first to third lenses; $f_{II}$ is the overall focal length of the fourth to eighth lenses; Ni is the refractive index of the glass of the i-th lens; and R12(13) is the radius of curvature of the rear surface of the sixth lens.

The inequalities of condition (3) represent a range for the ratio of the refractive power of the first lens unit I to the refractive power of the entire lens system, and the inequalities of condition (4) represent a range for the ratio of the refractive power of the first lens unit I to that of the second lens unit II. When both conditions are satisfied, the fundamental refractive power distribution over the lens system can be made so appropriate that, while the prescribed back focal length is secured, all aberrations are minimized over the entire area of the picture frame.

When the refractive power of the first lens unit I becomes too weak beyond the upper limit of the condition (3) or condition (4), the prescribed back focal length of, for example, not less than 2 times the diagonal of the effective picture frame becomes difficult to obtain. When the refractive power of the first lens unit I becomes too strong beyond the lower limit of the condition (3) or (4), though the back focal length can be secured long enough, the Petzval sum increases to the negative direction so that large field curvature results, and the difficulty of correcting spherical aberration and coma increases.

The inequalities of condition (5) represent a range of the refractive power of the rear surface of the sixth lens for well correcting the spherical aberration and coma of the second lens unit II. When the upper limit is exceeded, the spherical aberration is under-corrected, and the outward coma comes to increase. When the lower limit is exceeded, the spherical aberration is over-corrected, and the inward coma is increased objectionably.

The inequality of condition (6) represents a range of the mean value of the refractive indices of the glasses of the two negative lenses or the second and sixth lenses for maintaining the Petzval sum appropriate so that the field curvature is well corrected. When the condition is violated, the Petzval sum increases to the negative direction so that the field curvature is over-corrected objectionably.

The fifth and sixth lenses in the second lens unit II may be either cemented together or in broken contact.

Four examples of specific lenses of the invention can be constructed in accordance with the numerical data given in the following tables for the radii of curvature, R, the axial thicknesses or air separations, D, and the refractive indices, N, and Abbe numbers, $\nu$, of the glasses of the lens elements with the subscripts numbered consecutively from front to rear.

For note, the glass plate defined by the last two surfaces may be replaced by a color filter, a face plate and others as necessity arises.

The values of the factors in the above-described inequalities of conditions for these numerical examples are listed in Table-1.

Numerical Example 1 (FIG. 1(A))
F = 13.3   FNo = 1:1.4   2ω = 44.9°

| | | | | | | |
|---|---|---|---|---|---|---|
| R 1 = | 57.67 | D 1 = | 3.70 | N 1 = 1.80518 | $\nu$ 1 = 25.4 |
| R 2 = | −270.27 | D 2 = | 0.15 | | |
| R 3 = | 41.09 | D 3 = | 1.90 | N 2 = 1.80400 | $\nu$ 2 = 46.6 |
| R 4 = | 14.44 | D 4 = | 15.70 | | |
| R 5 = | −12.51 | D 5 = | 3.35 | N 3 = 1.51633 | $\nu$ 3 = 64.1 |
| R 6 = | −27.97 | D 6 = | 16.77 | | |
| R 7 = | Stop | D 7 = | 2.70 | | |
| R 8 = | 251.74 | D 8 = | 4.40 | N 4 = 1.77250 | $\nu$ 4 = 49.6 |
| R 9 = | −50.31 | D 9 = | 0.15 | | |
| R10 = | 20.45 | D10 = | 4.30 | N 5 = 1.60311 | $\nu$ 5 = 60.7 |
| R11 = | 137.06 | D11 = | 1.70 | N 6 = 1.84666 | $\nu$ 6 = 23.9 |
| R12 = | 18.96 | D12 = | 3.60 | | |
| R13 = | 83.01 | D13 = | 3.50 | N 7 = 1.60311 | $\nu$ 7 = 60.7 |
| R14 = | −46.63 | D14 = | 0.15 | | |
| R15 = | 20.95 | D15 = | 3.70 | N 8 = 1.60311 | $\nu$ 8 = 60.7 |
| R16 = | 215.29 | D16 = | 14.00 | | |
| R17 = | ∞ | D17 = | 5.40 | N 9 = 1.51633 | $\nu$ 9 = 64.1 |
| R18 = | ∞ | | | | |

Figure 1B:
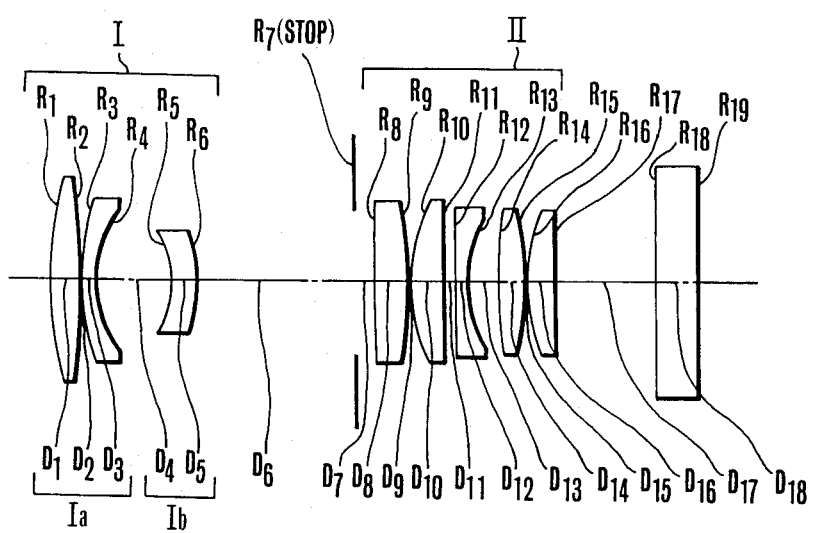

Numerical Example 2 (FIG. 1(B))
F = 13.3   FNo = 1:1.4   2ω = 44.9°

| | | | | | | |
|---|---|---|---|---|---|---|
| R 1 = | 51.05 | D 1 = | 3.70 | N 1 = 1.80518 | $\nu$ 1 = 25.4 |
| R 2 = | −160.26 | D 2 = | 0.15 | | |
| R 3 = | 39.93 | D 3 = | 1.90 | N 2 = 1.83481 | $\nu$ 2 = 42.7 |
| R 4 = | 13.16 | D 4 = | 10.42 | | |
| R 5 = | −11.98 | D 5 = | 3.35 | N 3 = 1.51633 | $\nu$ 3 = 64.1 |
| R 6 = | −22.12 | D 6 = | 20.44 | | |
| R 7 = | Stop | D 7 = | 2.70 | | |
| R 8 = | 218.31 | D 8 = | 4.40 | N 4 = 1.77250 | $\nu$ 4 = 49.6 |
| R 9 = | −64.56 | D 9 = | 0.15 | | |
| R10 = | 20.95 | D10 = | 4.30 | N 5 = 1.60311 | $\nu$ 5 = 60.7 |
| R11 = | 112.98 | D11 = | 1.80 | N 6 = 1.84666 | $\nu$ 6 = 23.9 |
| R12 = | 146.79 | D12 = | 1.70 | | |
| R13 = | 18.86 | D13 = | 4.22 | N 7 = 1.60311 | $\nu$ 7 = 60.7 |
| R14 = | 57.42 | D14 = | 3.50 | | |
| R15 = | −45.66 | D15 = | 0.15 | N 8 = 1.60311 | $\nu$ 8 = 60.7 |
| R16 = | 21.37 | D16 = | 3.70 | | |
| R17 = | 370.34 | D17 = | 14.00 | N 9 = 1.51633 | $\nu$ 9 = 64.1 |
| R18 = | ∞ | D18 = | 5.40 | | |
| R19 = | ∞ | | | | |

Figure 1C:
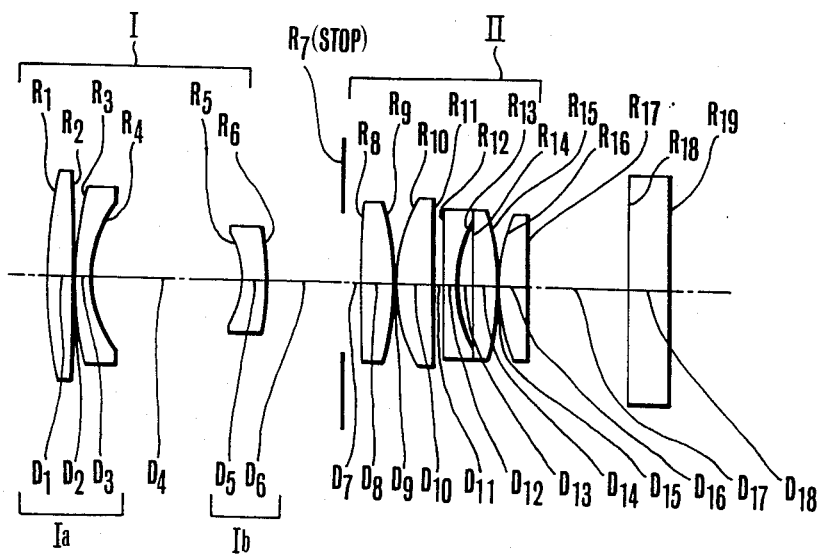

Numerical Example 3 (FIG. 1(C))
F = 13.3   FNo = 1:1.4   2ω = 44.9°

| | | | | | | |
|---|---|---|---|---|---|---|
| R 1 = | 53.37 | D 1 = | 3.70 | N 1 = 1.80518 | $\nu$ 1 = 25.4 |

-continued

| | | | | | | |
|---|---|---|---|---|---|---|
| R 2 = | −1299.57 | D 2 = | 0.15 | | | |
| R 3 = | 47.17 | D 3 = | 1.90 | N 2 = 1.80400 | ν 2 = 46.6 |
| R 4 = | 15.07 | D 4 = | 20.92 | | |
| R 5 = | −12.68 | D 5 = | 3.35 | N 3 = 1.51633 | ν 3 = 64.1 |
| R 6 = | −31.75 | D 6 = | 9.94 | | |
| R 7 = | Stop | D 7 = | 2.70 | | |
| R 8 = | −1222.08 | D 8 = | 4.40 | N 4 = 1.77250 | ν 4 = 49.6 |
| R 9 = | −37.86 | D 9 = | 0.15 | | |
| R10 = | 20.72 | D10 = | 4.30 | N 5 = 1.60311 | ν 5 = 60.7 |
| R11 = | 116.61 | D11 = | 1.69 | N 6 = 1.84666 | ν 6 = 23.9 |
| R12 = | 152.75 | D12 = | 1.70 | | |
| R13 = | 18.52 | D13 = | 2.17 | N 7 = 1.60311 | ν 7 = 60.7 |
| R14 = | 87.43 | D14 = | 3.50 | | |
| R15 = | −42.45 | D15 = | 0.15 | N 8 = 1.60311 | ν 8 = 60.7 |
| R16 = | 19.55 | D16 = | 3.70 | | |
| R17 = | 6470.68 | D17 = | 14.00 | N 9 = 1.51633 | ν 9 = 64.1 |
| R18 = | ∞ | D18 = | 5.40 | | |
| R19 = | ∞ | | | | |

Figure 1D:
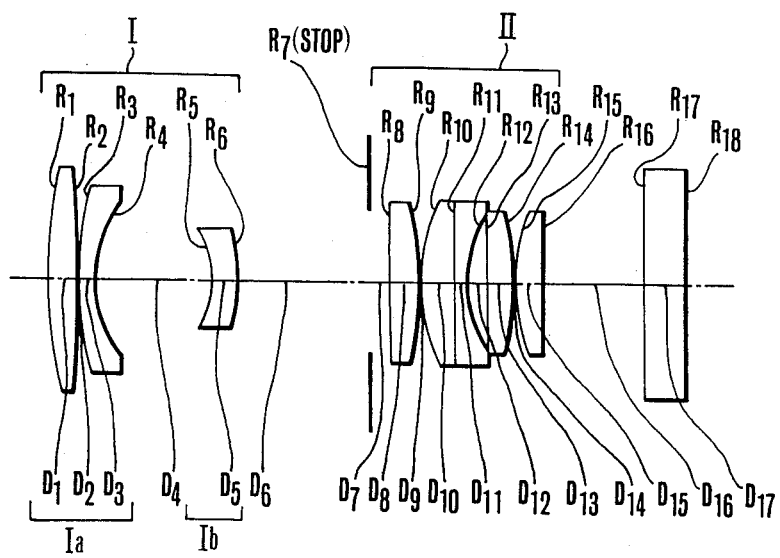

Numerical Example 4 (FIG. 1(D))
F = 13.3   FNo = 1:1.4   2ω = 44.9°

| | | | | | | |
|---|---|---|---|---|---|---|
| R 1 = | 62.32 | D 1 = | 3.70 | N 1 = 1.80518 | ν 1 = 25.4 |
| R 2 = | −238.43 | D 2 = | 0.15 | | |
| R 3 = | 40.86 | D 3 = | 1.90 | N 2 = 1.80400 | ν 2 = 46.6 |
| R 4 = | 14.96 | D 4 = | 15.93 | | |
| R 5 = | −12.50 | D 5 = | 3.35 | N 3 = 1.51633 | ν 3 = 64.1 |
| R 6 = | −26.48 | D 6 = | 17.23 | | |
| R 7 = | Stop | D 7 = | 2.70 | | |
| R 8 = | 318.39 | D 8 = | 4.40 | N 4 = 1.78590 | ν 4 = 44.2 |
| R 9 = | −50.46 | D 9 = | 0.15 | | |
| R10 = | 20.84 | D10 = | 4.30 | N 5 = 1.71300 | ν 5 = 53.8 |
| R11 = | 109.22 | D11 = | 1.70 | N 6 = 1.84666 | ν 6 = 23.9 |
| R12 = | 17.33 | D12 = | 2.70 | | |
| R13 = | 346.12 | D13 = | 3.50 | N 7 = 1.60311 | ν 7 = 60.7 |
| R14 = | −44.83 | D14 = | 0.15 | | |
| R15 = | 19.33 | D15 = | 3.70 | N 8 = 1.60311 | ν 8 = 60.7 |
| R16 = | −4045.33 | D16 = | 14.00 | | |
| R17 = | ∞ | D17 = | 5.40 | N 9 = 1.51633 | ν 9 = 64.1 |
| R18 = | ∞ | | | | |

TABLE 1

| Factor | Numerical Examples | | | |
|---|---|---|---|---|
| | 1 | 2 | 3 | 4 |
| $|R5/f|$ | 0.94 | 0.90 | 0.95 | 0.94 |
| D4/D6 | 0.81 | 0.45 | 1.66 | 0.80 |
| $|f_I/f|$ | 1.86 | 2.08 | 1.60 | 2.00 |
| $|f_I/f_{II}|$ | 1.16 | 1.23 | 1.06 | 1.27 |
| $|R12(13)/f|$ | 1.43 | 1.42 | 1.39 | 1.30 |
| (N2 + N6)/2 | 1.83 | 1.84 | 1.83 | 1.83 |
| Back Focal Length | 24.61 | 23.71 | 23.70 | 23.67 |
| $f_I$ | −24.79 | −27.64 | −21.33 | −26.54 |
| $f_{II}$ | 21.35 | 22.50 | 20.12 | 20.91 |

Another embodiment of the invention is described below by reference to FIGS. 2(A) to 2(D). In this embodiment, the lens system comprises, from front to rear, a first lens of positive refractive power with its front surface convex toward the front, a meniscus-shaped second lens of negative refractive power convex toward the front, a bi-concave third lens, a meniscus-shaped fourth lens of positive refractive power convex toward the front, a fifth lens of positive refractive power with its rear surface convex toward the rear, a bi-convex sixth lens, a meniscus-shaped seventh lens of negative refractive power concave toward the front, and an eighth lens of positive refractive power with its front surface convex toward the front, the aforesaid third and fourth lenses being cemented together to form a first doublet, and the aforesaid sixth and seventh lenses being cemented together to form a second doublet.

In this lens system, the on-axis light beam traverses the first and second lenses of the first lens unit I at a low height from the optical axis. Therefore, these lenses produce relatively small longitudinal aberrations. For the off-axis light beam, on the other hand, the height of incidence on the first and second lenses is relatively high.

Of the lateral aberrations, therefore, particularly astigmatism and distortion are produced largely.

In the present embodiment, to well correct the negative distortion produced from the second, third, fifth, sixth and eighth lenses, mainly the first lens is made up in the form of a positive lens with its front surface convex toward the front, and the positive refractive power of this front surface is made strengthened.

And, the form of the negative second lens also is made meniscus but convex toward the front. This enables this lens to produce as far small astigmatism as possible and to allow for its rear lens surface which is of negative refractive power and has a divergent action to be utilized for obtaining the prescribed back focal length.

Meanwhile, the strengthening of the positive refractive power of the front surface of the first lens causes large negative astigmatism to be produced from its rear surface.

And, the strengthening of the negative refractive power of the rear surface of the second lens causes production of large positive spherical aberration.

Accordingly, the third and fourth lenses are cemented together to form a first doublet. By properly specifying the curvature of the front surface of the third lens, the astigmatism produced by the first lens is well corrected, and by properly specifying the curvature of the cemented surface, the spherical aberration produced by the second lens is well corrected.

Also, inward coma is produced from the rear surface of the second lens. But this aberration is corrected by the rear surface of the meniscus-shaped fourth lens of forward convexity.

And, the aberrations produced in the lens unit I are well corrected in itself so that the variation of aberration with focusing is reduced as small as possible.

Because, in the embodiment of the invention, the inverted telephoto type is employed in the lens design, the on-axis light beam becomes divergent when it enters the fifth lens of the second lens unit II. On this account, the curvature of the front surface of the fifth lens is made weaker than that of its rear surface so that the divergent light beam is gradually changed to convergence to correct higher-order spherical aberrations.

The residual third to higher-order spherical aberrations are also corrected in good balance by making up the eighth lens in such a form that the front surface has a stronger curvature than the rear surface has.

And, the negative longitudinal chromatic aberration produced from the fifth and eighth lenses of positive refractive powers is corrected by the cemented surface of the second doublet consisting of the sixth and seventh lenses. The bi-convex form of this doublet minimizes the amount of coma and astigmatism produced therefrom. Another advantage of the cemented surface is that it corrects the spherical aberration left not fully corrected by the fifth and eighth lenses. By the thus-specified forms of all the lens elements, good correction of main aberrations is achieved.

Though the foregoing has been described in connection with the form of each lens element, the invention sets forth the following conditions too. When these conditions are also satisfied, the objects of the invention are accomplished.

Letting the focal length of the entire lens system be denoted by f, the radius of curvature of the i-th lens surface by $R_i$, the refractive index of the glass of the i-th lens by $N_i$, and the separations between the second and third lenses and between the fourth and fifth lenses by $D_4$ and $D_7$ respectively, the conditions are expressed as follows:

$$0.8 \leq |R_6/f| \leq 1.7 \quad (1)'$$

$$0.25 \leq D_4/D_7 \leq 5.0 \quad (2)'$$

$$0.15 \leq |N_3 - N_4| \quad (3)'$$

The technical significance of the above-defined conditions (1)' and (2)' is explained below.

The inequalities of condition (1)' represent a range of the curvature of the cemented surface of the first doublet for well correcting mainly the spherical aberration of the first lens unit I. When the curvature becomes too weak beyond the upper limit, the spherical aberration is over-corrected. When it becomes too strong beyond the lower limit, the spherical aberration is under-corrected. Also, in either case, the variation of spherical aberration with focusing is increased objectionably.

The inequalities of condition (2)' represent a proper range of the ratio of the separation D4 between the second lens and the first doublet or third lens to the separation D7 between the first doublet or fourth lens and the fifth lens for correcting the spherical aberration and astigmatism of the first lens unit I in good balance. When the separation D4 becomes too long beyond the upper limit, the astigmatism increases to the positive direction. When it becomes too short beyond the lower limit, the under-correction of spherical aberration is intensified.

The inequality of condition (3)' represent a proper range of the difference between the refractive indices of the glasses of the third and fourth lenses which constitute the first cemented doublet for giving the cemented surface a stronger refractive power than a certain value without causing the curvature of the cemented surface to be very increased, though this curvature falls within the range of condition (1)'.

When the refractive index difference lessens away from the condition (3)', good correction of spherical aberration becomes difficult to achieve, since the refractive power of the cemented surface cannot be so much increased.

In the present embodiment, by the thus-specified form and construction and arrangement of each lens of the first and second lens units I and II, a photographic lens of long back focal length well corrected for all aberrations is obtained.

To achieve a further improvement of the optical performance by now over the entire area of the picture frame, letting the focal length of the entire lens system be denoted by f, the overall focal length of the first to fourth lenses by $f_I$, the overall focal length of the fifth to eighth lenses by $f_{II}$, the radius of curvature of the cemented surface of the second doublet by R12, and the Abbe number of the glass of the i-th lens by $\nu i$, the following conditions are satisfied:

$$1.0 \leq |f_I/f| \leq 2.6 \quad (4)'$$

$$0.6 \leq |f_I/f_{II}| \leq 2.2 \quad (5)'$$

or $$0.9 \leq |R12/f| \leq 1.8 \quad (6)'$$

$$25 \leq |\nu 6 - \nu 7| \quad (7)'$$

The inequalities of condition (4)' represent a range of the ratio of the refractive power of the first lens unit I to that of the entire lens system, and the inequalities of condition (5)' represent a range of the ratio of the refractive power of the first lens unit I to that of the second lens unit II. When both conditions are satisfied, the fundamental refractive power distribution is determined to be appropriate so that while the prescribed back focal length is preserved, all image aberrations over the entire area of the picture frame are minimized.

When the refractive power of the first lens unit I becomes too weak beyond the upper limit of condition (4)' or (5)', the prescribed back focal length of, for example, not less than 2 times the diagonal of the effective picture frame, becomes difficult to obtain. When it becomes too strong beyond the lower limit of condition (4)' or (5)', though the back focal length becomes long enough, the Petzval sum increased to the negative direction so that the curvature of field is increased, and the difficulty of correcting spherical aberration and coma increases.

The inequalities of condition (6)' represent a range of the curvature of the cemented surface of the second doublet for well correcting the spherical aberration of the second lens unit II. When the upper limit is exceeded, the spherical aberration is under-corrected. When the lower limit is exceeded, it is over-corrected objectionably.

The inequality of condition (7)' represents a range of the difference between the Abbe numbers of the glasses of the sixth and seventh lenses which constitute the second doublet for well correcting the longitudinal chromatic aberration of the second lens unit II. When the Abbe number difference is too small beyond this condition, the refractive power of the cemented surface must be made stronger than necessary. Otherwise the longitudinal chromatic aberration could not be corrected. As a result, it becomes difficult to satisfy the condition (6)' or to achieve good correction of spherical aberration.

For note, in the above-described embodiments, for focusing purposes, one of the first and second lens units I and II may be moved while the other being held stationary, or both units may be moved either in unison or at different speeds from each other. Further, the first and second lenses in the first lens unit I may be unified and moved along with the third lens at different speeds. In any of these methods, the optical performance can be maintained stable at good level throughout the entire focusing range.

Figure 2A:
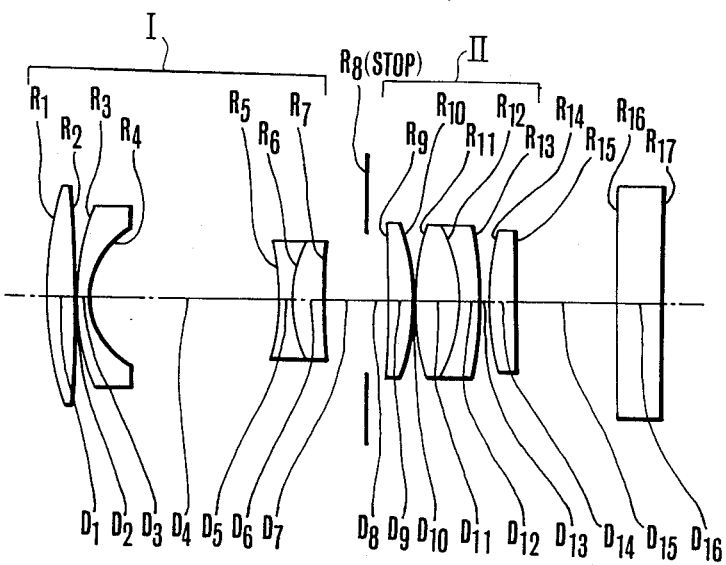
FIGS. 2(A)–2(D) are longitudinal section views of numerical examples 5 to 8 of another embodiment of lenses respectively according to the invention.

In the following, four numerical examples based on this embodiment are shown. Also, for reference, the values of the factors in the above-described conditions for these numerical examples are listed in Table-2;

| Numerical Example 5 (FIG. 2(A)) $F = 13.1$  $FNo = 1:1.4$  $2\omega = 45.5°$ | | | | |
|---|---|---|---|---|
| R 1 = 57.00 | D 1 = 3.50 | N 1 = 1.80518 | $\nu$ 1 = 25.4 |
| R 2 = −2730.70 | D 2 = 0.15 | | |
| R 3 = 29.21 | D 3 = 1.90 | N 2 = 1.69680 | $\nu$ 2 = 55.5 |
| R 4 = 11.18 | D 4 = 25.38 | | |
| R 5 = −24.99 | D 5 = 1.90 | N 3 = 1.53172 | $\nu$ 3 = 48.9 |
| R 6 = 20.72 | D 6 = 3.50 | N 4 = 1.80400 | $\nu$ 4 = 46.6 |
| R 7 = 66.28 | D 7 = 6.11 | | |
| R 8 = Stop | D 8 = 2.70 | | |
| R 9 = −436.40 | D 9 = 3.80 | N 5 = 1.69680 | $\nu$ 5 = 55.5 |
| R10 = −26.94 | D10 = 0.15 | | |
| R11 = 44.08 | D11 = 6.00 | N 6 = 1.60311 | $\nu$ 6 = 60.7 |
| R12 = −19.34 | D12 = 2.50 | N 7 = 1.84666 | $\nu$ 7 = 23.9 |
| R13 = −62.80 | D13 = 1.00 | | |
| R14 = 30.22 | D14 = 3.60 | N 8 = 1.71300 | $\nu$ 8 = 53.8 |
| R15 = 477.26 | D15 = 14.00 | | |
| R16 = ∞ | D16 = 5.40 | N 9 = 1.51633 | $\nu$ 9 = 64.1 |
| R17 = ∞ | | | |

Figure 2B:
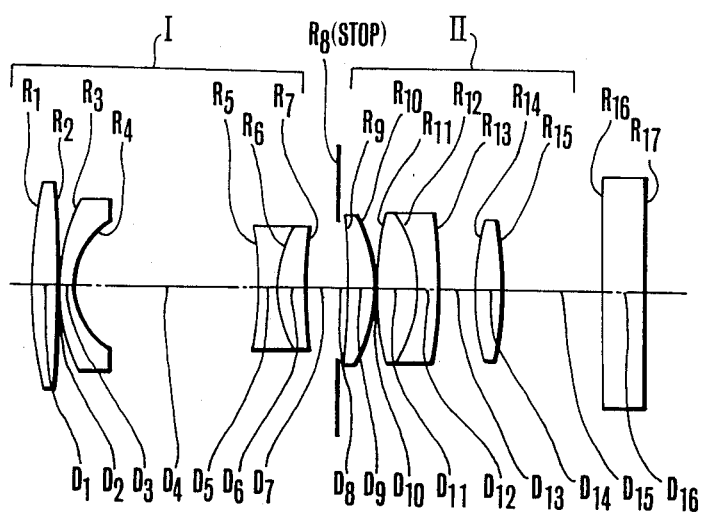

| Numerical Example 6 (FIG. 2(B)) $F = 13.5$  $FNo = 1:1.4$  $2\omega = 44.3°$ | | | | |
|---|---|---|---|---|
| R 1 = 55.86 | D 1 = 3.50 | N 1 = 1.80518 | $\nu$ 1 = 25.4 |
| R 2 = 9208.80 | D 2 = 0.15 | | |
| R 3 = 29.57 | D 3 = 1.90 | N 2 = 1.69680 | $\nu$ 2 = 55.5 |
| R 4 = 11.11 | D 4 = 25.15 | | |
| R 5 = −22.45 | D 5 = 1.90 | N 3 = 1.53113 | $\nu$ 3 = 62.4 |
| R 6 = 15.97 | D 6 = 3.50 | N 4 = 1.80400 | $\nu$ 4 = 46.6 |
| R 7 = 42.79 | D 7 = 4.50 | | |
| R 8 = Stop | D 8 = 1.20 | | |
| R 9 = −193.19 | D 9 = 3.80 | N 5 = 1.69680 | $\nu$ 5 = 55.5 |
| R10 = −23.68 | D10 = 0.15 | | |
| R11 = 47.69 | D11 = 6.00 | N 6 = 1.60311 | $\nu$ 6 = 60.7 |
| R12 = −15.60 | D12 = 2.50 | N 7 = 1.84666 | $\nu$ 7 = 23.9 |
| R13 = −48.83 | D13 = 4.76 | | |
| R14 = 34.73 | D14 = 3.60 | N 8 = 1.71300 | $\nu$ 8 = 53.8 |
| R15 = −116.78 | D15 = 14.00 | | |
| R16 = ∞ | D16 = 5.40 | N 9 = 1.51633 | $\nu$ 9 = 64.1 |
| R17 = ∞ | | | |

Figure 2C:
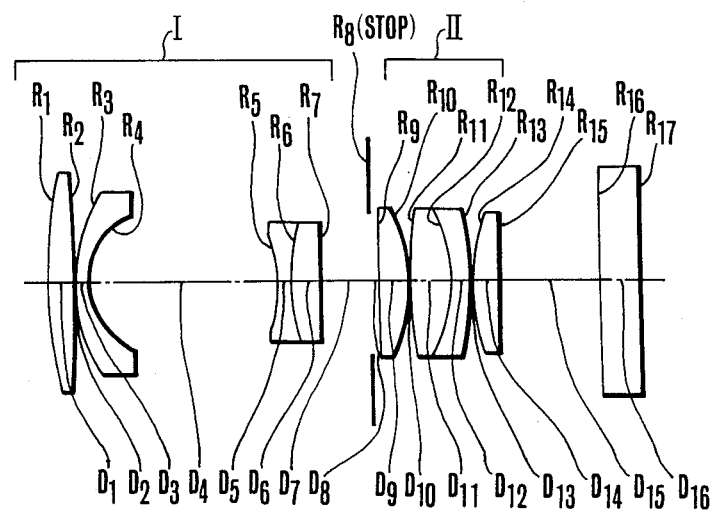

| Numerical Example 7 (FIG. 2(C)) $F = 13.1$  $FNo = 1:1.4$  $2\omega = 45.5°$ | | | | |
|---|---|---|---|---|
| R 1 = 56.01 | D 1 = 3.50 | N 1 = 1.80518 | $\nu$ 1 = 25.4 |
| R 2 = −6382.79 | D 2 = 0.15 | | |
| R 3 = 28.83 | D 3 = 1.90 | N 2 = 1.69680 | $\nu$ 2 = 55.5 |
| R 4 = 11.09 | D 4 = 25.34 | | |
| R 5 = −25.17 | D 5 = 1.90 | N 3 = 1.53172 | $\nu$ 3 = 48.9 |
| R 6 = 20.81 | D 6 = 3.50 | N 4 = 1.80400 | $\nu$ 4 = 46.6 |
| R 7 = 67.17 | D 7 = 7.20 | | |
| R 8 = Stop | D 8 = 1.20 | | |
| R 9 = −477.86 | D 9 = 3.80 | N 5 = 1.69680 | $\nu$ 5 = 55.5 |
| R10 = −26.74 | D10 = 0.15 | | |
| R11 = 44.04 | D11 = 6.00 | N 6 = 1.60311 | $\nu$ 6 = 60.7 |
| R12 = −19.06 | D12 = 2.50 | N 7 = 1.84666 | $\nu$ 7 = 23.9 |
| R13 = −62.80 | D13 = 0.15 | | |
| R14 = 30.31 | D14 = 3.60 | N 8 = 1.71300 | $\nu$ 8 = 53.8 |
| R15 = 588.56 | D15 = 14.00 | | |
| R16 = ∞ | D16 = 5.40 | N 9 = 1.51633 | $\nu$ 9 = 64.1 |
| R17 = ∞ | | | |

Figure 2D:
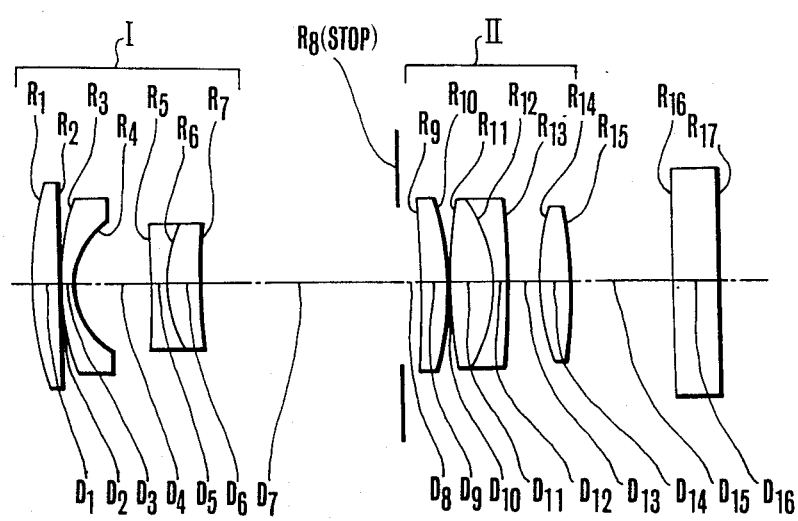
Figure 6A:
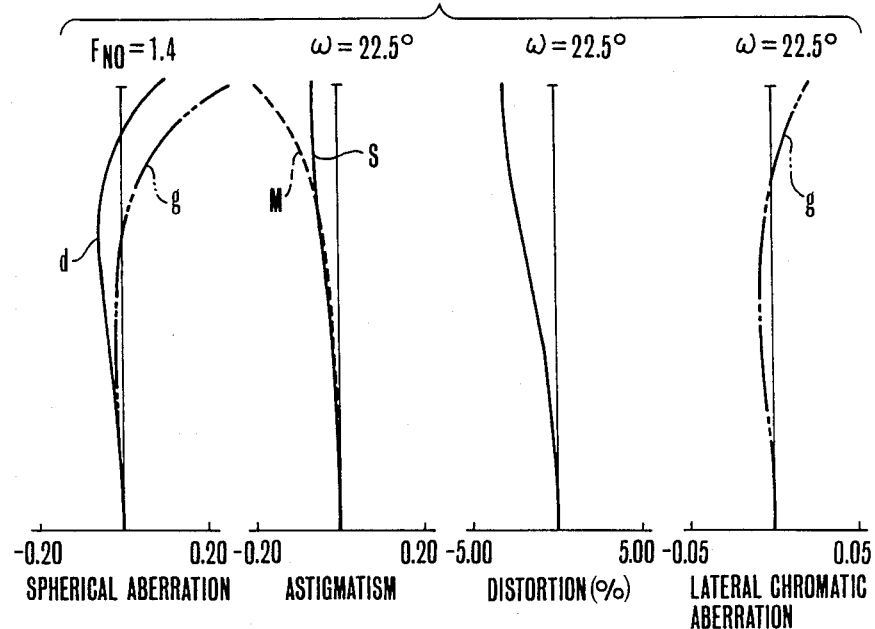
Figure 6B:
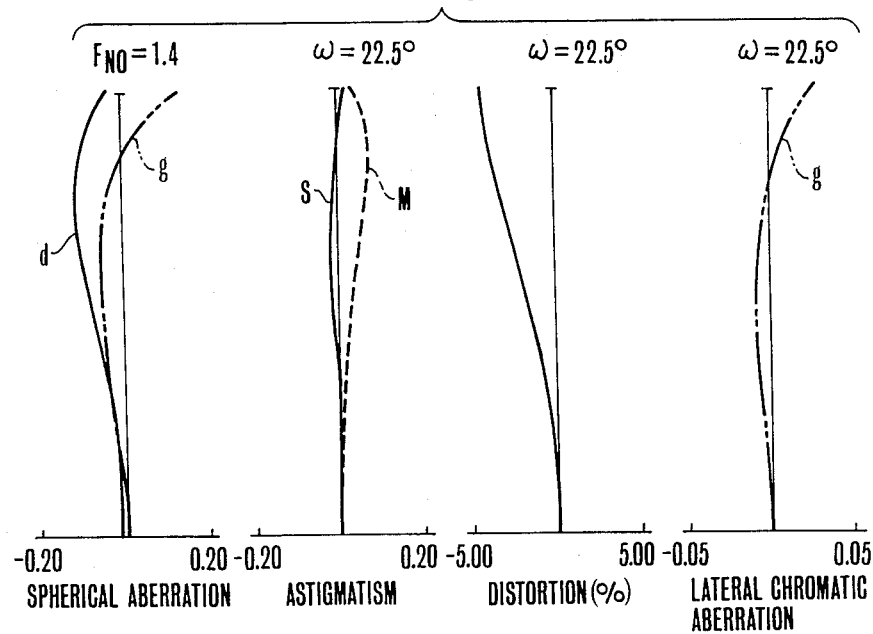
Figure 7A:
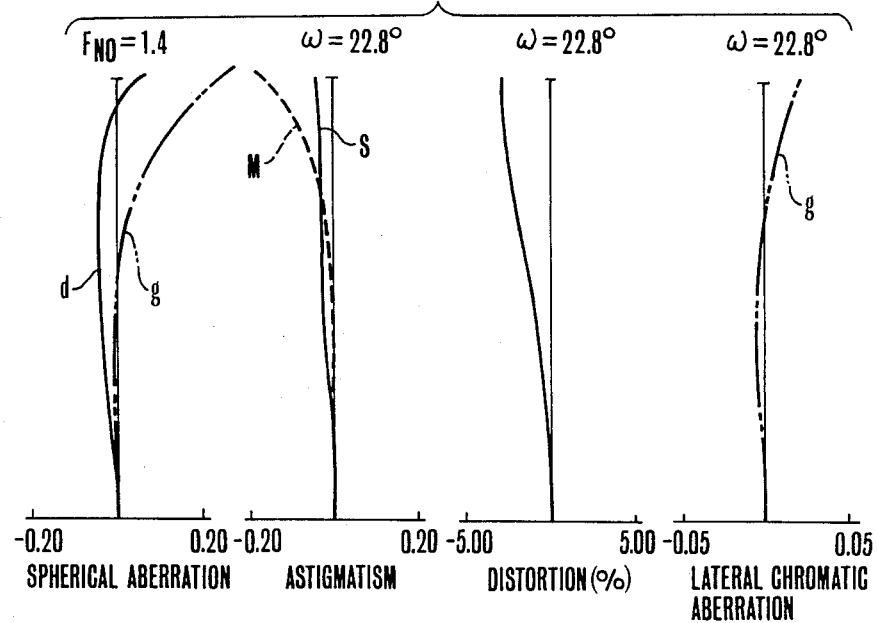
Figure 7B:
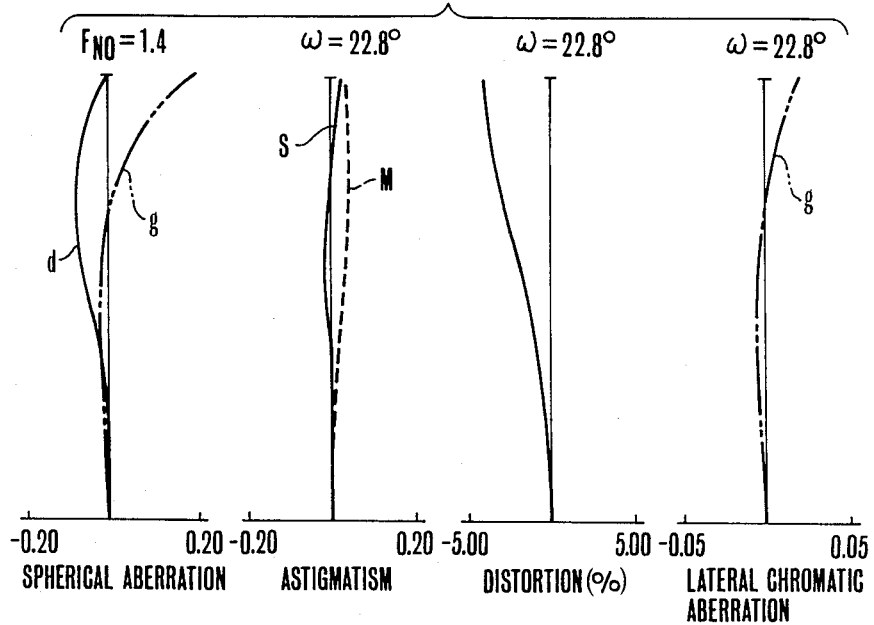
Figure 8A:
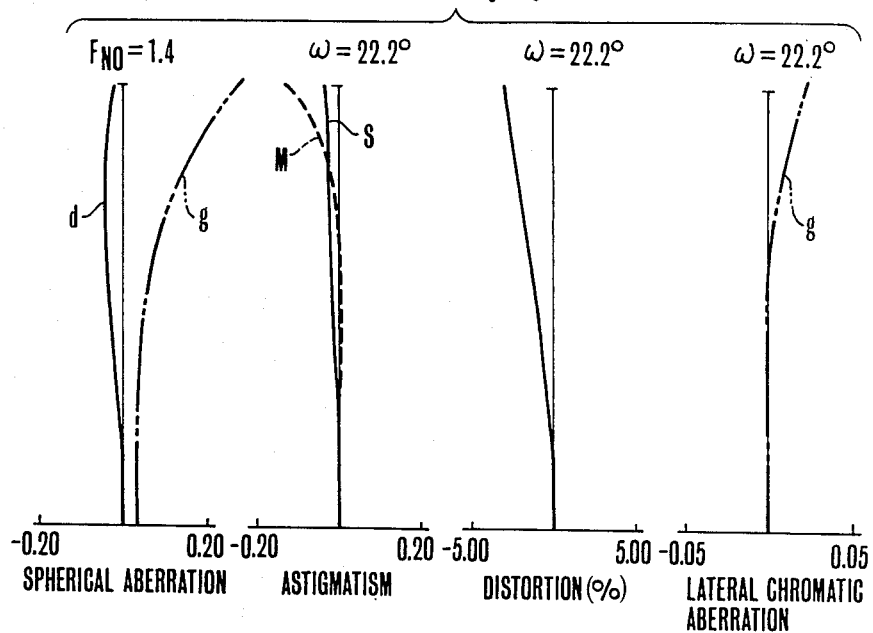
Figure 8B:
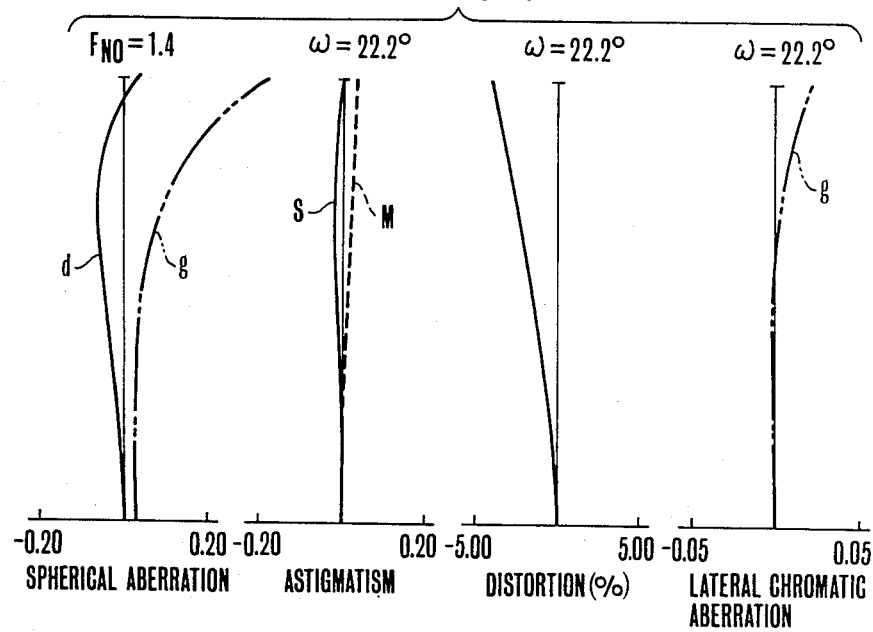
Figure 10A:
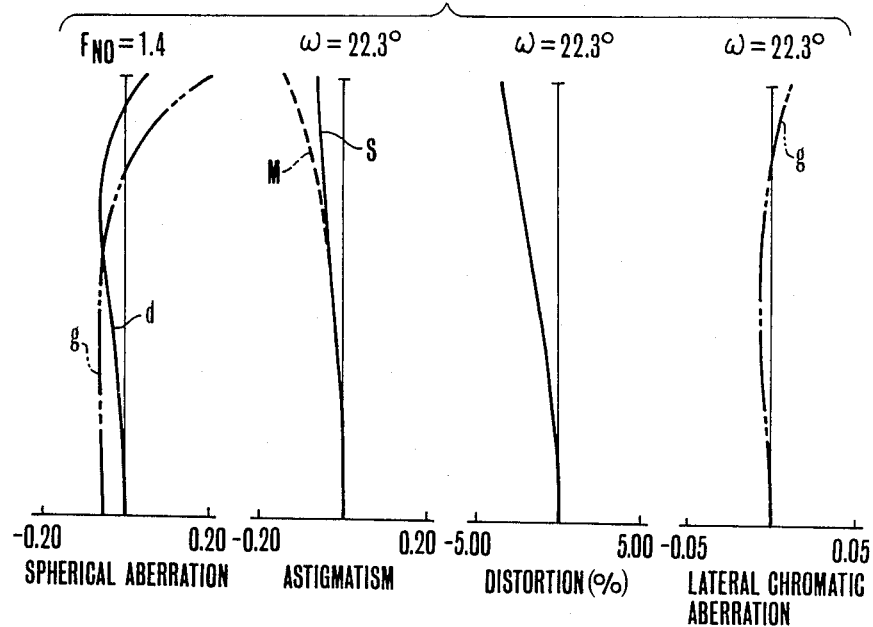
Figure 10B:
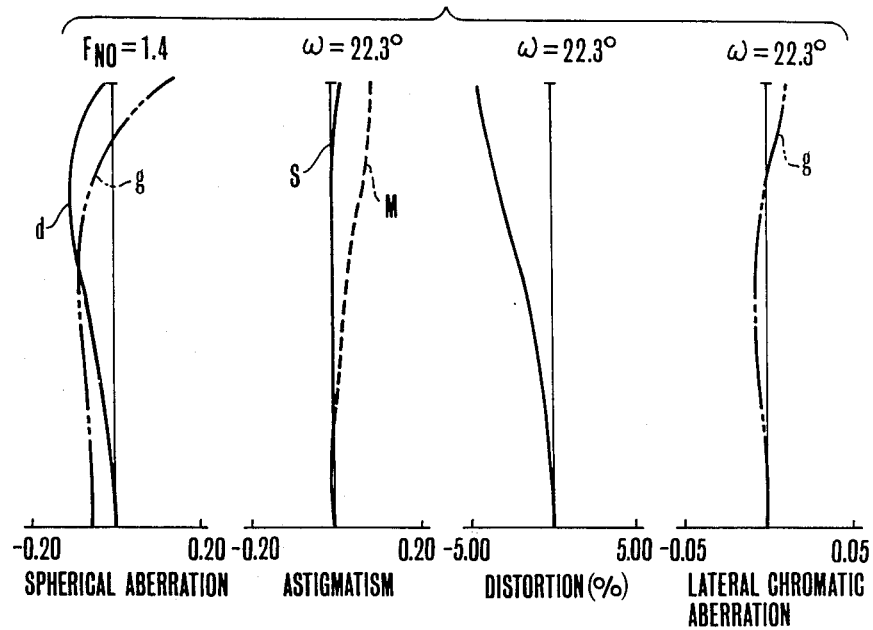

| Numerical Example 8 (FIG. 2(D)) $F = 13.4$  $FNo = 1:1.4$  $2\omega$ 44.6° | | | | |
|---|---|---|---|---|
| R 1 = 46.49 | D 1 = 3.20 | N 1 = 1.80518 | $\nu$ 1 = 25.4 |
| R 2 = 629.32 | D 2 = 0.15 | | |

-continued

| | | | | | |
|---|---|---|---|---|---|
| R 3 = | 32.70 | D 3 = | 1.90 | N 2 = 1.80400 | $\nu$ 2 = 46.6 |
| R 4 = | 10.93 | D 4 = | 10.42 | | |
| R 5 = | −114.00 | D 5 = | 1.80 | N 3 = 1.51633 | $\nu$ 3 = 64.1 |
| R 6 = | 13.98 | D 6 = | 4.20 | N 4 = 1.77250 | $\nu$ 4 = 49.6 |
| R 7 = | 45.89 | D 7 = | 27.23 | | |
| R 8 = | Stop | D 8 = | 2.80 | | |
| R 9 = | −280.01 | D 9 = | 3.80 | N 5 = 1.77250 | $\nu$ 5 = 49.6 |
| R10 = | −40.00 | D10 = | 0.15 | | |
| R11 = | 59.76 | D11 = | 6.00 | N 6 = 1.60311 | $\nu$ 6 = 60.7 |
| R12 = | −21.58 | D12 = | 1.90 | N 7 = 1.84666 | $\nu$ 7 = 23.9 |
| R13 = | −88.35 | D13 = | 4.50 | | |
| R14 = | 44.45 | D14 = | 3.60 | N 8 = 1.77250 | $\nu$ 8 = 49.6 |
| R15 = | −127.98 | D15 = | 14.00 | | |
| R16 = | ∞ | D16 = | 5.40 | N 9 = 1.51633 | $\nu$ 9 = 64.1 |
| R17 = | ∞ | | | | |

TABLE 2

| Factor | Numerical Examples | | | |
|---|---|---|---|---|
| | 5 | 6 | 7 | 8 |
| \|R6/f\| | 1.58 | 1.18 | 1.59 | 1.04 |
| D4/D7 | 2.88 | 4.41 | 3.02 | 0.35 |
| \|N3−N4\| | 0.272 | 0.273 | 0.272 | 0.256 |
| \|$f_I$/f\| | 1.52 | 1.25 | 1.53 | 2.32 |
| \|$f_I$/$f_{II}$\| | 1.11 | 0.95 | 1.14 | 1.33 |
| \|R12/f\| | 1.48 | 1.16 | 1.46 | 1.61 |
| \|6−7\| | 36.8 | 36.8 | 36.8 | 36.8 |
| Back Focal Length | 23.69 | 23.69 | 23.68 | 26.36 |
| $f_I$ | −19.91 | −16.90 | −20.09 | −31.06 |
| $f_{II}$ | 17.93 | 17.89 | 17.62 | 23.41 |

What is claimed is:

1. A photographic lens comprising:
   from front to rear,
   a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front; and
   a second lens unit having a positive refractive power, wherein said lens concave toward the front is a third lens in the form of a singlet, and further wherein the photographic lens satisfies the following conditions:

$$1.2 \leq |f_I/f| \leq 2.8$$

$$0.6 \leq |f_I/f_{II}| \leq 2.2$$

where f is the focal length of the entire lens system, and $f_I$ and $f_{II}$ are the focal lengths of said first and said second lens units, respectively.

2. A photographic lens according to claim 1, satisfying the following conditions:

$$0.7 \leq |R5/f| \leq 1.5$$

$$0.33 \leq D4/D6 \leq 2.0$$

where f is the focal length of the entire lens system, R5 is the radius of concave curvature of the front surface of said third lens toward the front, D4 is the axial separation from the rear surface of said second lens to said concave surface of said third lens, and D6 is the axial separation from the rear surface of said third lens which is concave toward the front to the frontmost surface of said second lens unit.

3. A photographic lens according to claim 1, wherein said second lens unit includes a fourth lens of positive refractive power, a fifth lens whose front surface has a stronger curvature than its rear surface, a sixth lens of negative refractive power whose rear surface is concave toward the rear, a bi-convex seventh lens and an eighth lens of positive refractive power.

4. A photographic lens according to claim 1, wherein said first lens unit is moved to effect focusing.

5. A photographic lens comprising:
   from front to rear,
   a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front; and
   a second lens unit having a postiive refractive power, wherein said lens concave toward the front is a third lens in the form of a singlet, and further wherein the photographic lens satisfies the following conditions:

$$0.7 \leq |R5/f| \leq 1.5$$

$$0.33 \leq D4/D6 \leq 2.0$$

where f is the focal length of the entire lens system, R5 is the radius of concave curvature of the front surface of said third lens toward the front, D4 is the axial separation from the rear surface of said second lens to said concave surface of said third lens, and D6 is the axial separation from the rear surface of said third lens which is concave toward the front to the frontmost surface of said second lens unit.

6. A photographic lens according to claim 5, wherein said second lens unit includes a fourth lens of positive refractive power, a fifth lens whose front surface has a stronger curvature than its rear surface, a sixth lens of negative refractive power whose rear surface is concave toward the rear, a bi-convex seventh lens and an eighth lens of positive refractive power.

7. A photographic lens according to claim 5, wherein said first lens unit is moved to effect focusing.

8. A photographic lens comprising:
   from front to rear,
   a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front; and
   a second lens unit having a positive refractive power, wherein said lens concave toward the front is a third lens in the form of a singlet, and wherein said second lens unit includes a fourth lens of positive refractive power, a fifth lens whose front surface has a stronger curvature than its rear surface, a sixth lens of negative refractive power whose rear surface is concave toward the rear, a bi-convex seventh lens and an eighth lens of positive refractive power, and further wherein the photographic lens satisfies the following conditions:

$$1.0 \leq |R12(13)/f| \leq 1.8$$

$$1.7 \leq (N2+N6)/2$$

where f is the focal length of the entire lens system R12(13) is the radius of curvature of the rear surface of said sixth lens, and N2 and N6 are the refractive indices of the glasses of said second and said sixth lenses, respectively.

9. A photographic lens comprising:
from front to rear,
a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front; and
a second lens unit having a positive refractive power, wherein said lens whose frontmost surface is concave toward the front consists of a third lens having a negative refractive power and a fourth lens having a positive refractive power cemented together, and further wherein the photographic lens satisfies the following conditions:

$$1.0 \leq |f_I/f| \leq 2.6$$

$$0.6 \leq |f_I/f_{II}| \leq 2.2$$

where f is the focal length of the entire lens system, and $f_I$ and $f_{II}$ are the focal lengths of said first and said second lens units, respectively.

10. A photographic lens according to claim 9, satisfying the following conditions:

$$0.8 \leq |R6/f| \leq 1.7$$

$$0.25 \leq D4/D7 \leq 5.0$$

$$0.15 \leq |N3-N4|$$

where f is the focal length of the entire lens system, R6 is the radius of curvature of the cemented surface of said third and said fourth lenses, D4 is the axial separation between said second and said third lenses, D7 is the axial separation from the rear surface of said fourth lens to the front surface of said second lens unit, and N3 and N4 are the refractive indices of said third and said fourth lenses, respectively.

11. A photographic lens according to claim 9, wherein said second lens unit includes a fifth lens of positive refractive power whose rear surface is convex toward the rear, a bi-convex sixth lens, a seventh lens cemented together with said sixth lens and formed to a meniscus shape of negative refractive power concave toward the front, and an eighth lens of positive refractive power whose front surface is convex toward the front.

12. A photographic lens according to claim 9, wherein said first lens unit is moved to effect focusing.

13. A photographic lens according to claim 12, herein said second lens unit includes a fourth lens of positive refractive power, a fifth lens whose front surface has stronger curvature than its rear surface, a sixth lens of negative refractive power whose rear surface is concave toward the rear, a bi-convex seventh lens and an eighth lens of positive refractive power.

14. A photographic lens according to claim 13, satisfying the following conditions:

$$0.8 \leq |R6/f| \leq 1.7$$

$$0.15 \leq |N3-N4|$$

where f is the focal length of the entire lens system, R6 is the radius of curvature of the cemented surface of said third and said fourth lenses, and N3 and N4 are the refractive indices of said third and said fourth lenses, respectively.

15. A photographic lens comprising:
from front to rear,
a first lens unit having a negative refractive power, said first lengths unit including a first lens having a positive refractive power and whose front surface is convex toward the front, a meniscus-shaped second lens having a negative refractive power and convex toward the front, and a lens whose frontmost surface is concave toward the front; and
a second lens unit having a positive refractive power, wherein said lens whose frontmost surface is concave toward the front consists of a third lens having a negative refractive power and a fourth lens having a positive refractive power cemented together, and further wherein the photographic lens satisfies the following conditions:

$$0.8 \leq |R6/f| \leq 1.7$$

$$0.25 \leq D4/D7 \leq 5.0$$

$$0.15 \leq |N3-N4|$$

where f is the focal length of the entire lens system, R6 is the radius of curvature of the cemented surface of said third and said fourth lenses, D4 is the axial separation between said second and said third lenses, D7 is the axial separation from the rear surface of said fourth lens to the front surface of said second lens unit, and N3 and N4 are the refractive indices of said third and said fourth lenses respectively.

16. A photographic lens according to claim 15, wherein said second lens unit includes a fifth lens of positive refractive power whose rear surface is convex toward the rear, a bi-convex sixth lens, a seventh lens cemented together with said sixth lens and formed to a meniscus shape of negative refractive power concave toward the front, and an eighth lens of positive refractive power whose front surface is convex toward the front.

17. A photographic lens according to claim 15, wherein said first lens unit is moved to effect focusing.

18. A photographic lens according to claim 16, satisfying the following conditions:

$$0.7 \leq |R5/f| \leq 1.5$$

wherein f is the focal length of the entire lens system, R5 is the radius of concave curvature of the front surface of said third lens towards the front.

19. A photographic lens according to claim 18, satisfying the following conditions:

$$1.0 \leq |f_I/f| \leq 2.6$$

$$0.6 \leq |f_I/f_{II}| \leq 2.2$$

where f is the focal length of the entire lens system, and $f_I$ and $f_{II}$ are the focal lengths of said first and said second lens units, respectively.

20. A photogrpahic lens comprising:
from front to rear,
a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front; and
a second lens unit having a positive refractive power, wherein said lens whose frontmost surface is concave toward the front consists of a third lens having a negative refractive power and a fourth lens having a positive refractive power cemented together, and
wherein said second lens unit includes a fifth lens of positive refractive power whose rear surface is convex toward the rear, a bi-convex sixth lens, a seventh lens cemented together with said sixth lens and formed to a meniscus shape of negative refractive power concave toward the front, and an eighth lens of positive refractive power whose front surface is convex toward the front, and further wherein the photographic lens satisfies the following conditions:

$$0.9 \leq |R12/f| \leq 1.8$$

$$25 \leq |\gamma 6 - \gamma 7|$$

wherein f is the focal length of the entire lens system, R12 is the radius of curvature of the rear surface of said sixth lens, and γ6 and γ7 are the Abbe numbers of said sixth and seventh lenses, respectively.

21. A photographic lens comprising from front to rear;
a first lens unit having a negative refractive power, said first lens unit consisting of a first lens having a positive refractive power and whose front surface is convex toward the front, a meniscus-shaped second lens having a negative refractive power and convex toward the front, and a third lens whose frontmost surface is concave toward the front; and
a second lens unit having a positive refractive power, wherein D4 is the axial separation from the rear surface of said second lens to said concave surface of said third lens, and D6 is the axial separation from the rear surface of said third lens which is concave toward the front to the frontmost surface of said second lens unit, and satisfying the following condition:

$$0.33 \leq D4/D6 \leq 2.0.$$

22. A photographic lens according to claim 2, satisfying the following conditions:

$$1.0 \leq |R12(13)/f| \leq 1.8$$

$$1.7 \leq (N2+N6)/2$$

where f is the focal length of the entire lens, system R12(13) is the radius of curvature of rear surface of said sixth lens, and N2 and N6 are the refractive indices of the glasses of said second and said sixth lenses, respectively.

23. A photographic lens according to claim 22, wherein said second lens unit includes a fifth lens of positive refractive power whose rear surface is convex toward the rear, a bi-convex sixth lens, a seventh lens cemented together with said sixth lens and formed to a meniscus shape of negative refractive power concave toward the front, and an eighth lens of positive refractive power whose front surface is convex toward the front.

24. A photographic lens comprising from front to rear:
a first lens unit having a negative refractive power, said first lens unit including a first lens having a positive refractive power and whose front surface is convex toward the front, a meniscus-shaped second lens having a negative refractive power and convex toward the front, and a lens whose frontmost surface is concave toward the front consists of a third lens having a negative refractive power and a fourth lens having a positive refractive power cemented together, wherein D4 is the axial separation between said second and said third lens, D7 is the axial separation from the rear surface of said fourth lens to the front surface of said second lens unit, and satisfying the following condition:

$$0.25 \leq D4/D7 \leq 5.0.$$

25. A photographic lens according to claim 24, satisfying the following conditions:

$$0.9 \leq |R12/f| \leq 1.8$$

$$25 \leq |\gamma 6 - \gamma 7|$$

where f is the focal length of the entire lens system, R12 is the radius of curvature of the rear surface of said sixth lens, and γ6 and γ7 are the Abbe number of said sixth and seventh lenses, respectively.

* * * * *

UNITED STATES PATENT AND TRADEMARK OFFICE
CERTIFICATE OF CORRECTION

PATENT NO. : 4,856,881
DATED : August 15, 1989
INVENTOR(S) : Akihiko Shiraishi

It is certified that error appears in the above-identified patent and that said Letters Patent is hereby corrected as shown below: Title page:

[75]     Inventor:

"Akihiko Shiraishi, Kanagawa, Japan" should read
--Akihiko Shiraishi, Kawasaki, Japan--.

COLUMN 1:

Line 18, "have their" should read --has its--.

Line 24, "just ahead" should read --just ahead of--.

Line 49, "cient to correct" should read --ciently corrected--.

Line 54, "intended to achieve," should read --intended to be achieved,--.

COLUMN 2:

Line 62, "made move," should read --made to move,--.

COLUMN 3:

Line 46, "especially," should read --especially--.

UNITED STATES PATENT AND TRADEMARK OFFICE
CERTIFICATE OF CORRECTION

PATENT NO. : 4,856,881

DATED : August 15, 1989

INVENTOR(S) : Akihiko Shiraishi

It is certified that error appears in the above-identified patent and that said Letters Patent is hereby corrected as shown below:

COLUMN 4:

Line 58, "$1.2 \leq | F_1/f | \leq 2.8 \ldots (3)$" should read --$1.2 \leq | f_1/f | \leq 2.8 \ldots (3)$--.

COLUMN 6:

Line 29, "Table-1" should read --Table 1--.

COLUMN 10:

Line 3, "represent" should read --represents--.

Line 9, "very increased," should read --greatly increased,--.

COLUMN 12:

Line 14, "Table-2;" should read --Table 2.--.

COLUMN 14:

Line 33, "postiive" should read --positive--.

COLUMN 15:

Line 16, "system" should read --system,--.

UNITED STATES PATENT AND TRADEMARK OFFICE
CERTIFICATE OF CORRECTION

PATENT NO. : 4,856,881

DATED : August 15, 1989

INVENTOR(S) : Akihiko Shiraishi

It is certified that error appears in the above-identified patent and that said Letters Patent is hereby corrected as shown below:

COLUMN 16:

Line 5, "herein" should read --wherein--.

Line 26, "said first lengths unit" should read --said first lens unit--.

COLUMN 17:

Line 1, "wherein" should read --where--.

Line 14, "photogrpahic" should read --photographic--.

Line 41, "$25 \leq | \gamma_6 - \gamma_7 |$" should read --$25 \leq | v_6 - v_7 |$--.

Line 43, "wherein" should read --where--.

Line 45, "$\gamma_6$ and $\gamma_7$" should read --$v_6$ and $v_7$--.

UNITED STATES PATENT AND TRADEMARK OFFICE
CERTIFICATE OF CORRECTION

PATENT NO. : 4,856,881

DATED : August 15, 1989

INVENTOR(S) : Akihiko Shiraishi

It is certified that error appears in the above-identified patent and that said Letters Patent is hereby corrected as shown below:

<u>COLUMN 18</u>:

Line 41, "said third lens," should read --said third lenses,--.

Line 43, "said" (second occurrence) should read --a--.

Line 52, "$25 \leq |\gamma_6 - \gamma_7|$" should read --$25 \leq |v_6 - v_7|$--.

Line 56, "Abbe number" should read --Abbe numbers--, and "$\gamma_6$ and $\gamma_7$" should read --$v_6$ and $v_7$--.

Signed and Sealed this

Fifteenth Day of October, 1991

*Attest:*

HARRY F. MANBECK, JR.

*Attesting Officer*  *Commissioner of Patents and Trademarks*